United States Patent
Pardi et al.

[11] Patent Number: 5,934,443
[45] Date of Patent: Aug. 10, 1999

[54] FIN ALIGNMENT AND DELIVERY APPARATUS

[75] Inventors: Ronald Pardi, Canton; James C. Rollinson, Westland; Daniel J. Stark, Woodhaven; William J. Maybee, Brighton; Eddy G. Mizzi, Allen Park; Walter Kowalewski, Canton; Paul Krause, Brighton, all of Mich.

[73] Assignees: Ford Motor Company, Dearborn; Progressive Tool Industries, Southfield, both of Mich.

[21] Appl. No.: 08/791,709

[22] Filed: Jan. 31, 1997

[51] Int. Cl.⁶ .................................................. B65G 47/26
[52] U.S. Cl. ................... 198/457.05; 198/406; 198/367; 198/358; 198/444; 198/463.4; 193/44
[58] Field of Search .................................. 198/406, 367, 198/358, 444, 463.4, 457.05, 539; 193/44

[56] References Cited

U.S. PATENT DOCUMENTS

| | | | |
|---|---|---|---|
| 1,777,048 | 9/1930 | Molins | 198/406 |
| 1,826,379 | 10/1931 | Birkmeyer et al. | 198/406 |
| 2,916,792 | 12/1959 | Crook et al. | 198/572 X |
| 3,310,080 | 3/1967 | Delcellier | 198/358 X |
| 3,385,457 | 5/1968 | Zinn | 214/6 |
| 3,625,336 | 12/1971 | Fuwa et al. | 198/456 X |
| 3,650,233 | 3/1972 | Young et al. | |
| 3,656,605 | 4/1972 | Gess | 198/406 X |
| 3,733,673 | 5/1973 | Young et al. | |
| 3,767,027 | 10/1973 | Pund et al. | 198/452 |
| 3,853,215 | 12/1974 | Paiva | |
| 3,944,049 | 3/1976 | Graybill | 198/444 X |
| 4,242,025 | 12/1980 | Thibault | |
| 4,274,531 | 6/1981 | Whitmore | 198/397 |
| 4,321,739 | 3/1982 | Martin et al. | |
| 4,486,933 | 12/1984 | Iwase et al. | |
| 4,566,359 | 1/1986 | Miyagi et al. | |
| 4,611,375 | 9/1986 | Zapawa | |
| 4,637,132 | 1/1987 | Iwase et al. | |
| 4,637,133 | 1/1987 | Freeman | |
| 4,771,876 | 9/1988 | Bandixen | 198/367 |
| 4,984,678 | 1/1991 | Fauchard | 198/443 |
| 5,022,814 | 6/1991 | Breda et al. | |
| 5,120,189 | 6/1992 | Breda et al. | |
| 5,157,944 | 10/1992 | Hughes et al. | |
| 5,186,599 | 2/1993 | Fluck | |
| 5,431,530 | 7/1995 | Kobayashi et al. | 414/794.4 |
| 5,870,819 | 2/1999 | Maybee et al. | |

FOREIGN PATENT DOCUMENTS

| | | | |
|---|---|---|---|
| 0612202 | 1/1961 | Canada | 198/358 |
| 2854533 | 8/1979 | Germany | 198/358 |
| 61-166432 | 1/1986 | Japan | |
| 757417 | 1/1980 | U.S.S.R. | |

*Primary Examiner*—Johnny D. Cherry
*Assistant Examiner*—Steven B. McAllister
*Attorney, Agent, or Firm*—Raymond L. Coppiellie

[57] ABSTRACT

An apparatus for aligning and delivering fins manufactured in a fin mill for use in manufacture and assembly of heat exchangers used for controlling temperature conditions. The apparatus includes first and second conveyors, the first conveyor receiving and transporting fins emanating from a fin mill, and the second conveyer delivering the fins to an apparatus for manufacturing and assembling a heat exchanger. A tier of chutes reorient the direction of the fins with respect to the direction of the conveyor travel.

19 Claims, 5 Drawing Sheets

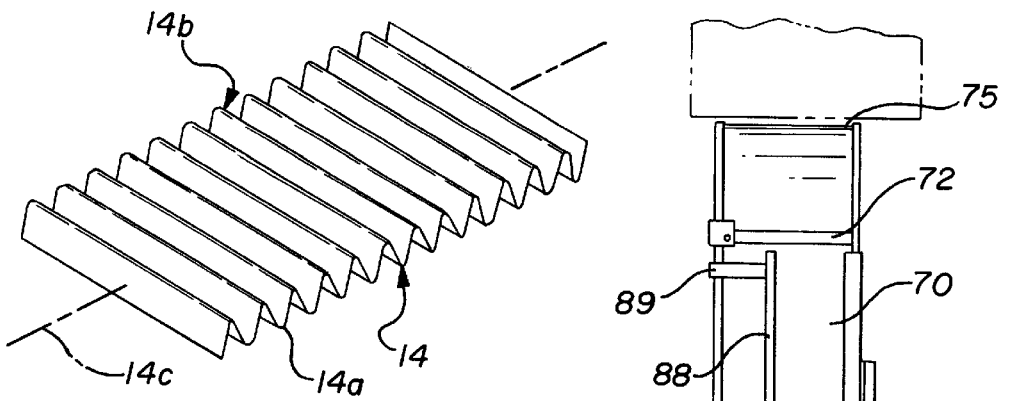
FIG-7
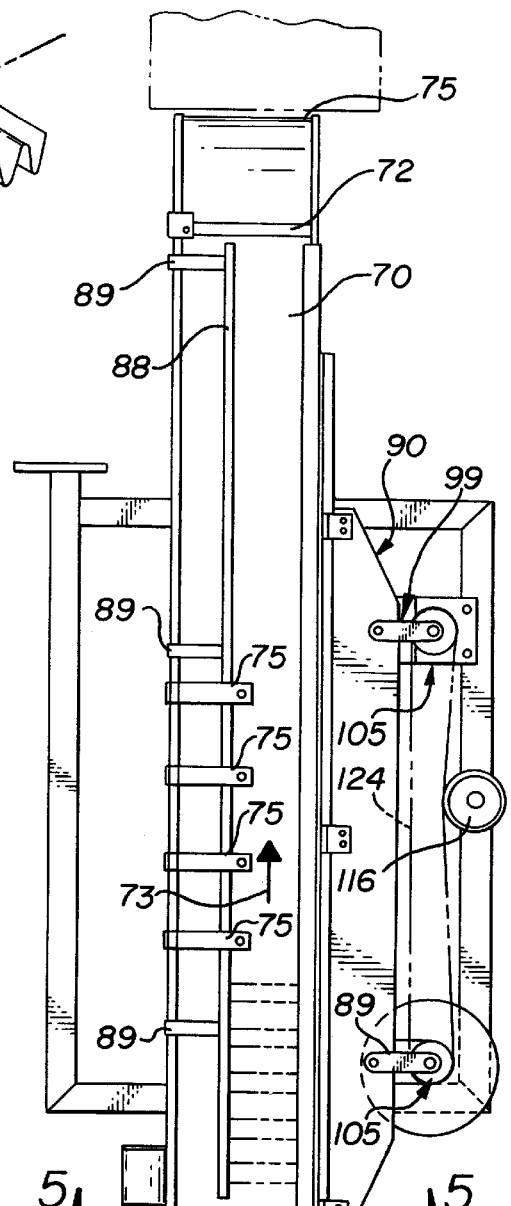
FIG-2
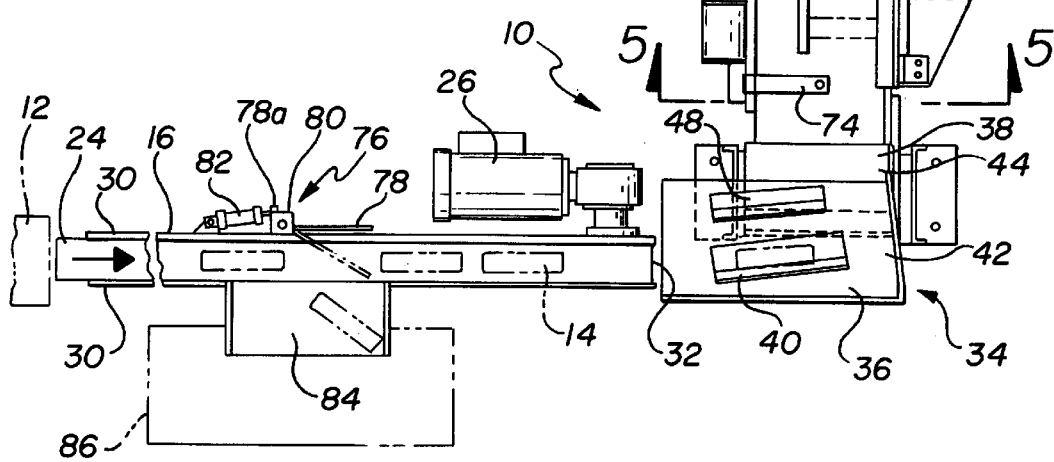

FIN ALIGNMENT AND DELIVERY APPARATUS

BACKGROUND OF THE INVENTION

1. Field of the Invention

The present invention relates generally to a fin handling system and, more specifically, to an apparatus for reorienting and delivering a fin emanating from a fin mill as a preliminary step in a manufacturing process.

2. Description of the Related Art

Fin mills produce a fin for use in the manufacture of a conventional fin and tube heat exchanger. The fin mill forms a fin from a flat strip or stock by alternately bending the strip in an accordion fashion, i.e., weaving the fold back and forth such that the fold lines are transverse to the longitudinal axis of the fin. The fin exits the fin mill in a direction parallel its longitudinal axis.

When used in the manufacture of a heat exchanger, the fin is installed in the heat exchanger in a direction perpendicular or transverse to its longitudinal axis. Thus, it is necessary to reorient the direction of the fin prior to positioning it in the heat exchanger. When this process is completed manually, it results in a labor intensive and time consuming endeavor.

Therefore, there is a need in the art to provide an apparatus which receives the fin emanating from the fin mill and aligns and delivers the fin in such a manner that it may be readily inserted into the heat exchanger during manufacture and assembly without the need for manual input.

SUMMARY OF THE INVENTION

The present invention is an apparatus for alignment and delivery of a plurality of fins to a machine used to manufacture and assemble heat exchangers. The apparatus includes a first conveyor and a second conveyor interconnected by a tier of chutes. The fins are deposited on the first conveyor and travel in a direction parallel to their longitudinal axis. Upon sliding through the tier of chutes, the fins are deposited on the second conveyor and travel in a direction perpendicular to their longitudinal axis. A queue forms on the second conveyor to provide a ready supply of fins for use in the manufacture and assembly of the heat exchanger.

One advantage of the present invention is that the fins emanating from the fin mill may be transferred directly to the apparatus for manufacturing the heat exchanger without the need for manual intervention. This allows the manufacture of a product in a facile and economical manner.

Other features and advantages of the present invention will be readily appreciated as the same becomes better understood after reading the subsequent description when considered in connection with the accompanying drawings.

BRIEF DESCRIPTION OF THE DRAWINGS

FIG. 2 is a top view of the present invention of FIG. 1.

FIG. 7 is a perspective view of a fin.

DESCRIPTION OF THE PREFERRED EMBODIMENT(S)

Figure 1:
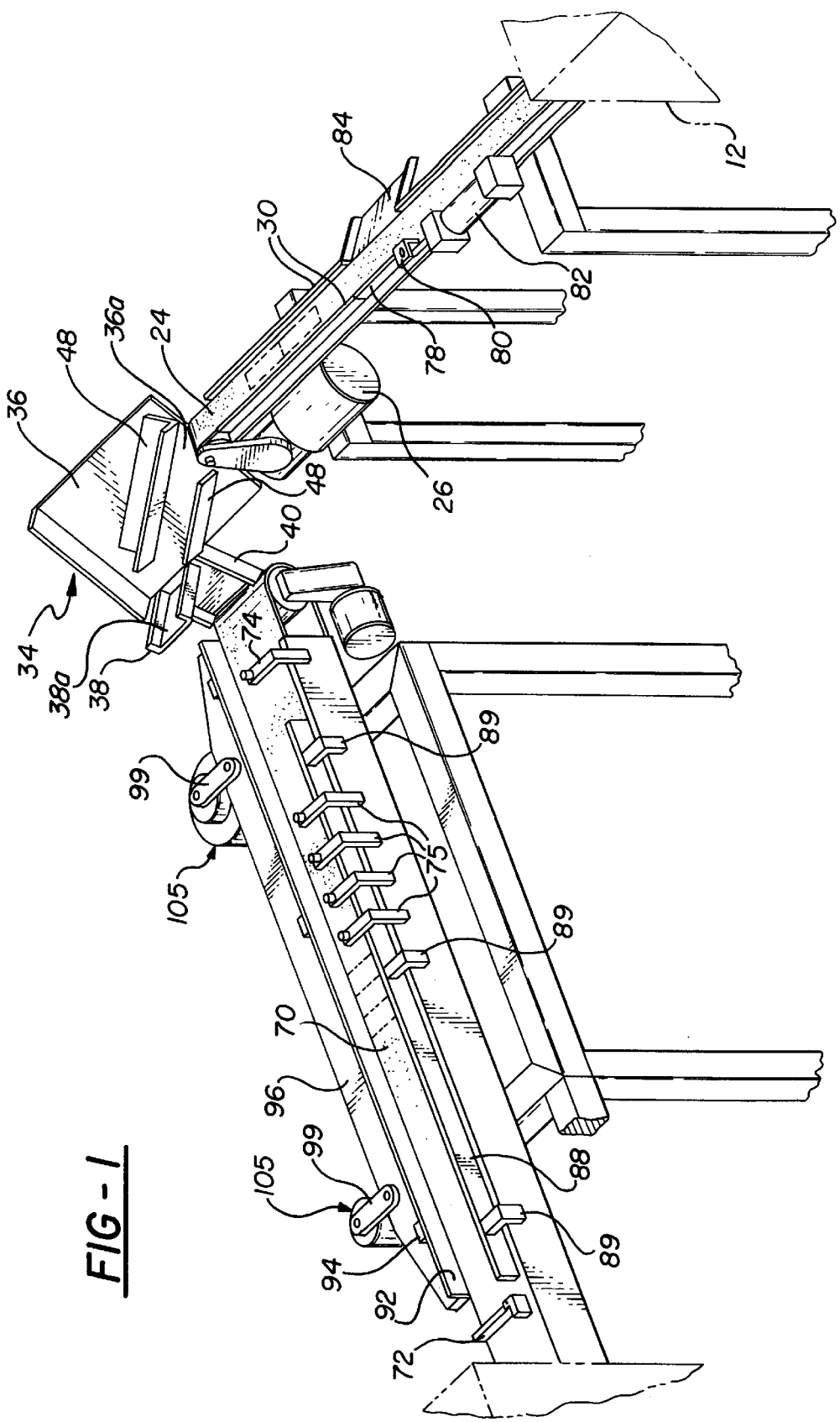
FIG. 1 is a perspective view of an apparatus according to the present invention.
Figure 3:
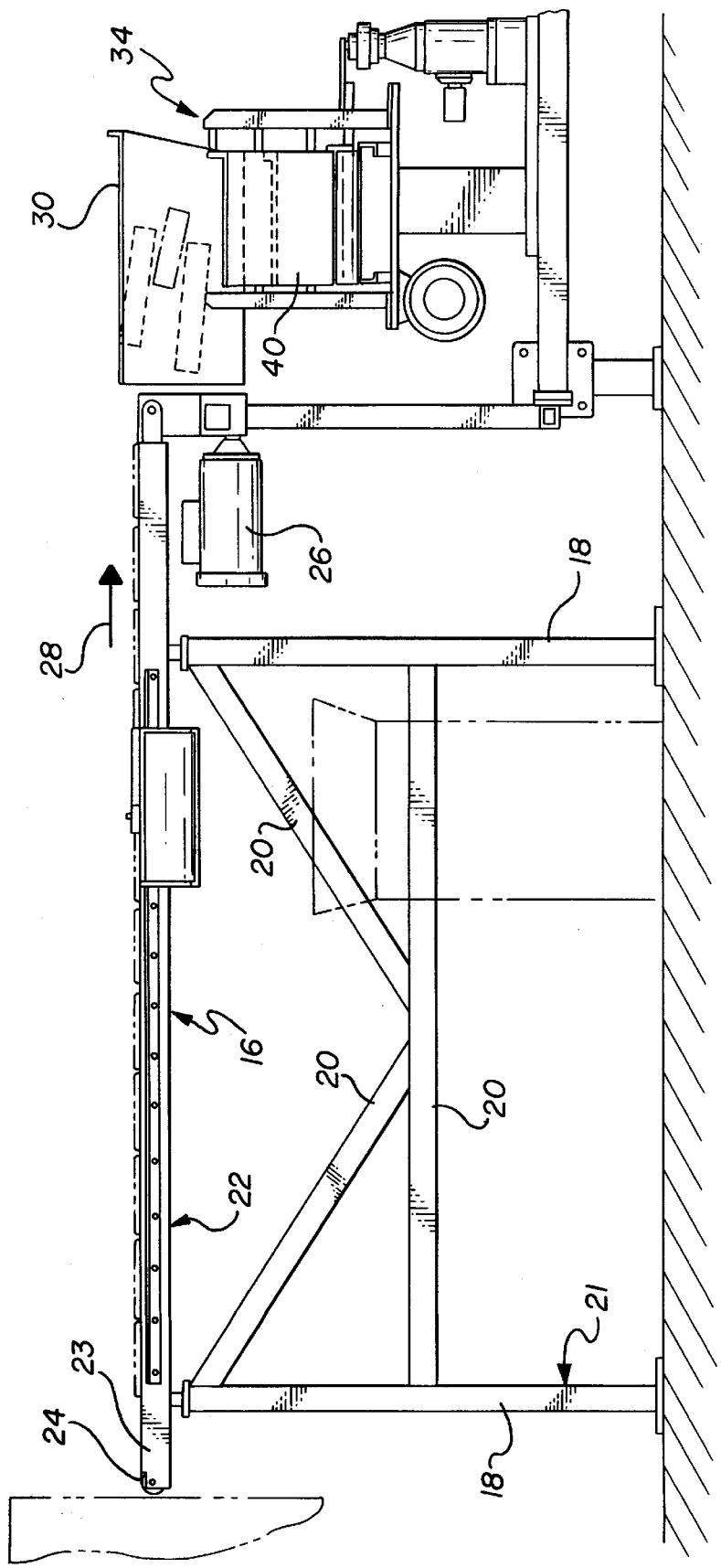
FIG. 3 is a side view of a first conveyor and tier of chutes of FIG. 1.

An embodiment of the present invention will now be described with reference to FIGS. 1 through 6. Turning now to FIGS. 1 through 4, a fin alignment and delivery apparatus 10 is shown. A fin mill 12 forms fins 14 for use in heat exchangers. Each fin 14 is accordion folded, with the fold lines occurring transverse to a longitudinal axis 14c of the fin 14. The fin 14 is discharged from the fin mill 12 onto a first conveyor 16 of the fin alignment and delivery apparatus 10. A plurality of upright members 18 and brace members 20 form a first conveyor frame 21 of the first conveyor 16. A conveyor base 22 rests on the first conveyor frame 21. A first conveyor belt 24, supported on a C-shaped member 23, is driven by a first drive motor 26 in the direction shown by the arrow 28. A pair of guide rails 30 are secured to the conveyor base 22 and form a path of travel for the fins 14 emanating from the fin mill 12.

The fins 14 exit the first conveyor 16 at a discharge end 32. Placed adjacent the discharge end 32 of the first conveyor 16 is a tier of chutes, seen generally at 34. The tier of chutes 34 includes a first chute 36, a second chute 38 and a third chute 40. The first chute 36 includes planar slide surface 42; the second chute 38 includes a planar slide surface 44; and the third chute 40 includes a planar slide surface 46. A pair of guide plates 48, forming a secondary channel 50, extend outward from the planar slide surface 42 of the first chute 36. Each of the first, second and third chutes 36, 38 and 40 respectively, are mounted via a plurality of rods 52, 54, 56, to an upright frame 58. In the disclosed embodiment, the upright frame 58 is attached to a base 60 of a second conveyor 62. However, the upright frame 58 could be attached to the base 22 of the first conveyor 16 or it could stand independently. Each of the first, second and third chutes 36, 38 and 40 are capable of pivoting about the respective rods 52, 54 and 56 to vary the angle of inclination with respect to the first and second conveyors 16, 18 which normally transport the fin 14 in a horizontal plane.

The fin 14 slides through the tier of chutes 34 in the following manner. The bottom 14a of the fin 14, that is part of the fin 14 engaging the first conveyor belt 24 of the first conveyor 16, engages the planar slide surface 42 of the first chute 36 upon being discharged from the first conveyor 16. The guide plates 48 forming the secondary channel 50 ensure that as the fin 14 is discharged, its travel along the planar slide surface 42 of the first chute 36 is controlled. Upon encountering the lower edge 36a of the first chute 36, the fin 14 falls downward into an opening 37 between the first chute 36 and second chute 38. Upon striking the planar slide surface 44 of the second chute 38, the fin 14 flips over such that the top 14b of the fin 14 now engages the planar slide surface 44 of the second chute 38. The fin 14 then slides down the second chute 38 until it encounters an edge 38a of the second chute 38 at which point it drops it downward into an opening 39 between the second and third chutes 38, 40. Upon striking the planar slide surface 46 of the third chute 40, the fin 14 again flips over such that the bottom 14a of the fin 14 engages the planar slide surface 46 of the third chute 40. The fin 14 then completes its slide down the third chute 40 until it is deposited on the second conveyor 62.

Figure 4:
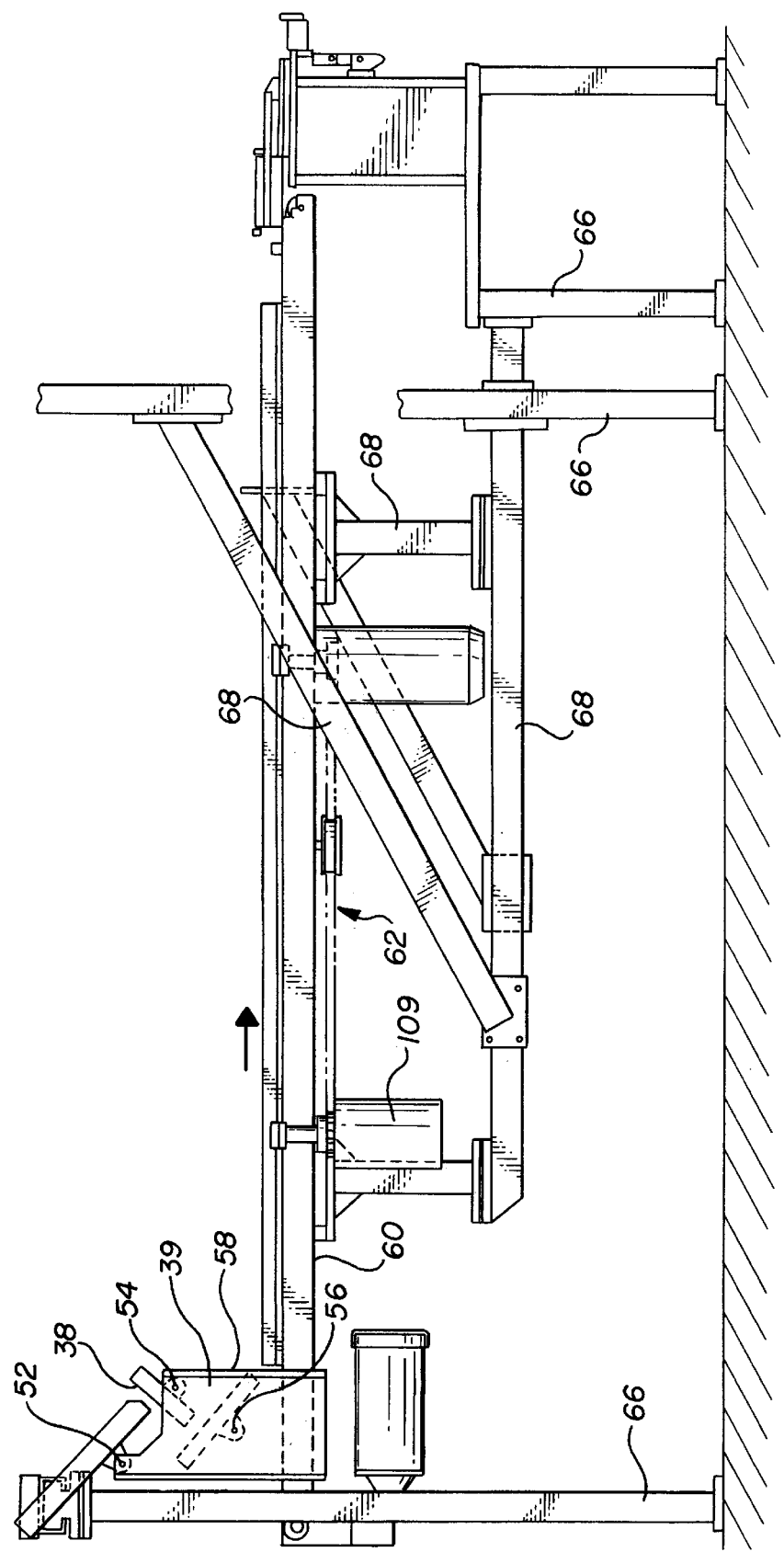
FIG. 4 is a side view of a second conveyor and tier of chutes of FIG. 1.

A plurality of upright members 66 and cross braces 68 form a second conveyor frame 64 for supporting a conveyor base 60 of the second conveyor 62. A second conveyor belt 70 is supported on a C-shaped belt support 71 secured to the base 60. As shown in FIGS. 2 and 4, the second conveyor belt 70 moves in the direction of the arrow 73.

A sensor 74 is placed over the belt 70 and detects the presence of fins 14. A stop 72, positioned adjacent the discharge end 75, acts to hold the fins 14 on the conveyor 16 until they are needed in the manufacturing process. One attribute of the apparatus 10 is that the belt 70 continues to move in the direction shown by the arrow 73 and the fins 14 stack up and slide on the second conveyor belt 70 forming a queue. If the queue increases to the point where the sensor 74 detects the presence of a stationary fin 14, an overflow mechanism, seen generally at 76, mounted to the first conveyor 16, is actuated.

The overflow mechanism 76 includes a gate 78 attached to the frame 21 of the first conveyor 16 through a pivot pin and bracket assembly 80. A power cylinder 82 engages one end 78a of the gate 78 and upon receiving a signal from the sensor 74 urges the gate 78 across the conveyor belt 24. The gate 78 diverts the fins 14 traveling along the first conveyor 16 onto an overflow chute 84 and correspondingly into an overflow storage receptacle, seen generally at 86. Thus, should the apparatus for manufacturing the heat exchanger be inoperative, the fin mill 12 will continue to manufacture fins 14 for use at a later time. Additional sensors 74 may also be positioned on the second conveyor 62 to detect the presence of fins 14, i.e., the size of the queue, and based on their readings, the rate of manufacture of fins 14 by the fin mill 12 may be varied.

Figure 5:
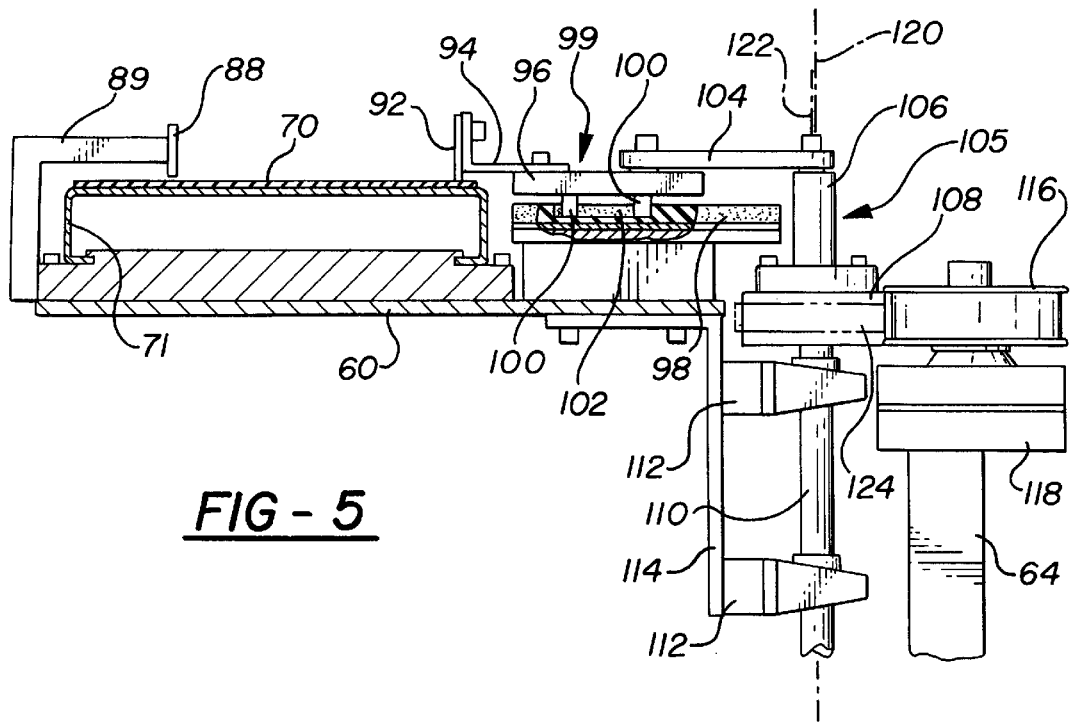
FIG. 5 is a cross-sectional view of an oscillating guide taken along lines 5—5 of FIG. 2.
Figure 6:
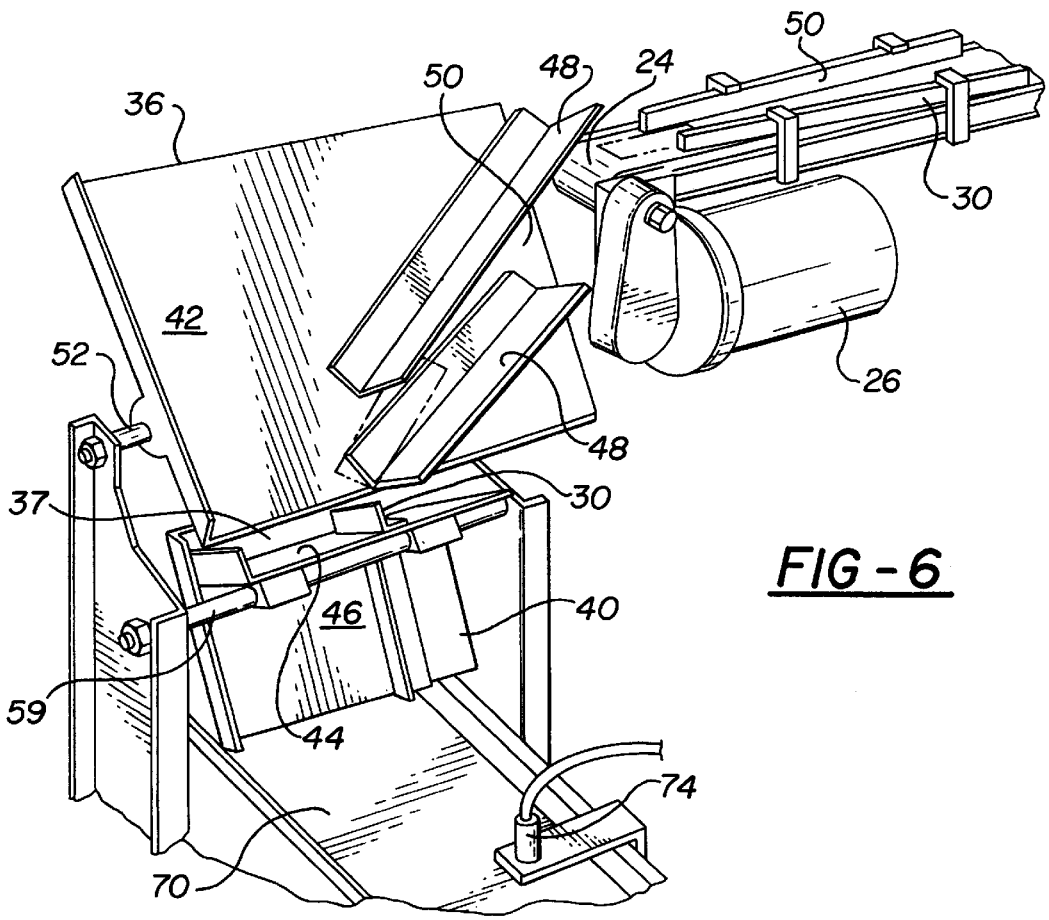
FIG. 6 is a partial perspective view of the chutes of FIG. 1.

Turning back to FIGS. 2, 4 and 5, the second conveyor 62 includes a fixed guide 88 secured to the frame 64 via a plurality of brackets 89, and an oscillating guide, seen generally at 90. The oscillating guide 90 includes a guide rail 92 secured through a mounting bracket 94 to a carriage 96. As shown in FIG. 5, the carriage 96 is mounted for oscillating movement, transverse the direction of second conveyor belt 70 movement, on a support 98. A plurality of drivetrains, seen generally at 99, are used to oscillate the carriage 96. Each drivetrain 99 is identical and therefore only one will be described herein.

The drivetrain 99 includes pins 100 which extend from the carriage 96 and engage a slot 102 in the support 98. A drive link 104 is attached on one end to the carriage 96 and on the opposite end to a powertrain, seen generally at 105. The powertrain 105 includes a spindle 106 that engages the drive link 104. A pulley 108 supports the spindle 106 and is rotatably secured to a shaft 110. The shaft 110 is supported by a pair of shaft supports 112 attached via a bracket 114 to the conveyor base 60 of the second conveyor 62. A motor 109 is connected to and drives the shaft 110. As illustrated in FIG. 5, the centerline 120 of the spindle 106 is offset from the centerline 122 of the pulley 108. Thus, as the pulley 108 rotates about the shaft 110, the spindle 106 moves in an eccentric manner which causes the drive link 104 and corresponding carriage 96 to oscillate.

As shown in FIG. 2, the powertrains 105 are synchronized by a common belt 124. The belt 124 may be a toothed belt to ensure that the respective pulleys 108 of each powertrain 105 are synchronized. An idler pulley 116, mounted to an idler pulley support 118 secured to the frame 64, provides proper tension in the belt 124.

As shown in FIG. 2, the fin alignment and delivery apparatus 10 provides an economical and facile apparatus for reorienting the fins 14 traveling in a direction parallel their longitudinal axis on the first conveyor 16 to a direction of travel perpendicular their longitudinal axis on the second conveyor 62. The fins 14 are held in a queue in the second conveyor 62 for use in a downstream manufacturing operation to assemble heat exchangers.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An apparatus for transporting and delivering fins emanating from a fin mill, said apparatus comprising:
    a first conveyor transporting the fins emanating from the fin mill in a direction parallel to a longitudinal axis of each of the fins;
    a second conveyor spaced laterally from, and at a substantially right angle to an end of said first conveyor; and
    a tier of three separate chutes disposed between the end of said first conveyor and an end of said second conveyor for receiving the fins from the fin mill via said first conveyor and depositing the fins on said second conveyor such that the longitudinal axis of each of the fins is perpendicular to a direction of travel of said second conveyor, each of said fins traveling through a first chute in a direction parallel to the longitudinal axis of each fin, traveling through a second chute, and exiting a third chute in a direction perpendicular to the longitudinal axis of each fin.

2. An apparatus as set forth in claim 1 wherein said first chute includes a pair of guide plates extending outward and forming a secondary channel.

3. An apparatus as set forth in claim 1 wherein said first conveyor includes a plurality of guide rails positioned thereon to guide the fins, a gate, pivotally mounted to said first conveyor, said gate movable between a first, open position and a second, closed position wherein when said gate is placed in said first, open position, the fins travel freely on said first conveyer to said tier of three separate chutes and when said gate is positioned in said second, closed position, the fins contact said gate and are shunted from said first conveyer to an overflow storage receptacle.

4. An apparatus as set forth in claim 3 including a sensor mounted on said second conveyor, said sensor detecting the presence of fins, said sensor signaling said overflow gate to move to said second, closed position when said sensor detects the presence of fins.

5. An apparatus as set forth in claim 1 including an oscillating guide positioned on said second conveyor.

6. An apparatus as set forth in claim 5 wherein said oscillating guide includes a carriage mounted for oscillatory movement on a support member, a guide rail attached to said carriage, and a drive link attached on a first end thereof to said carriage and attached on a second end thereof to a powertrain driving said drive link.

7. An apparatus for transporting and delivering fins emanating from a fin mill, said apparatus comprising:
    a first conveyor transporting the fins emanating from the fin mill in a direction parallel to a longitudinal axis of each of the fins;
    a chute receiving the fins from the fin mill via said first conveyor and depositing the fins on a second conveyor such that the longitudinal axis of each of the fins is perpendicular to a direction of travel of said second conveyor;

an oscillating guide positioned on said second conveyor;
said oscillating guide including a carriage mounted for oscillatory movement on a support member, a guide rail attached to said carriage, and a drive link attached on a first end thereof to said carriage and attached on a second end thereof to a powertrain driving said drive link; and
wherein said powertrain includes a pulley supported on a shaft for rotational movement, a drive motor connected to and driving said shaft, and a spindle attached to said pulley and connected to said drive link.

8. An apparatus as set forth in claim 7 including said spindle having a centerline and said pulley having a centerline, said spindle attached to said pulley such that the centerline of said spindle is offset from the centerline of said pulley.

9. An apparatus for transporting and delivering fins emanating from a fin mill, said apparatus comprising:
a first conveyor transporting the fins emanating from said fin mill in a direction parallel to a longitudinal axis of said fins;
a second conveyor having one end spaced laterally from an end of said first conveyor; and
a tier of separate chutes disposed between the ends of said first conveyor and said second conveyor for receiving said fins from said fin mill via said first conveyor and depositing said fins on said second conveyor such that the longitudinal axis of said fins is perpendicular to the direction of travel of said second conveyor, said tier of separate chutes including a first chute receiving said fins traveling in a direction parallel their longitudinal axis, a second chute positioned below said first chute and receiving said fins upon said fins exiting said first chute, and a third chute, said third chute positioned below said second chute and receiving said fin upon said fins exiting said second chute wherein said fins exit said third chute onto said second conveyor in a position such that the fins travel in a direction transverse their longitudinal axis; and
an oscillating guide positioned on said second conveyer.

10. An apparatus as set forth in claim 9 wherein said first conveyor includes a plurality of guide rails positioned thereon to guide said fins, a gate, pivotally mounted to said first conveyor, said gate movable between a first, open position and a second, closed position wherein when said gate is placed in said first, open position, said fins travel freely on said first conveyor from said fin mill to said tier of chutes and when said gate is positioned in said second, closed position said fins contact said gate and are shunted from said first conveyor to an overflow storage receptacle.

11. An apparatus as set forth in claim 9 wherein said first chute includes a pair of guide plates extending outward and forming a secondary channel.

12. An apparatus as set forth in claim 9 wherein said oscillating guide includes a carriage mounted for oscillatory movement on a support member, a guide rail attached to said carriage, and a drive link attached on a first end thereof to said carriage and attached on a second end thereof to a powertrain driving said drive link.

13. An apparatus for transporting and delivering fins emanating from a fin mill, said apparatus comprising:
a first conveyor transporting the fins emanating from said fin mill in a direction parallel a longitudinal axis of said fins;
a tier of chutes receiving said fins from said fin mill via said first conveyor and depositing said fins on a second conveyor such that the longitudinal axis of said fins is perpendicular to the direction of travel of said second conveyor, said tier of chutes including a first chute receiving said fins traveling in a direction parallel their longitudinal axis, a second chute positioned below said first chute and receiving said fins upon said fins exiting said first chute, and a third chute, said third chute positioned below said second chute and receiving said fin upon said fins exiting said second chute wherein said fins exit said third chute onto said second conveyor in a position such that the fins travel in a direction transverse their longitudinal axis;
an oscillating guide positioned on said second conveyer; and
said oscillating guide including a drive link and a powertrain driving said drive link, said powertrain including a pulley supported on a shaft for rotational movement, a drive motor connected to and driving said shaft, and a spindle attached to said pulley and connected to said drive link.

14. An apparatus as set forth in claim 13 including said spindle having a centerline and said pulley having a centerline, said spindle attached to said pulley such that the centerline of said spindle is offset from the centerline of said pulley.

15. An apparatus for transporting and delivering fins emanating from a fin mill, said apparatus comprising:
a first conveyor transporting the fins emanating from said fin mill in a direction parallel a longitudinal axis of said fins;
a tier of chutes receiving said fins from said fin mill via said first conveyor and depositing said fins on a second conveyor such that the longitudinal axis of said fins is perpendicular to the direction of travel of said second conveyor, said tier of chutes including a first chute receiving said fins traveling in a direction parallel their longitudinal axis, a second chute positioned below said first chute and receiving said fins upon said fins exiting said first chute, and a third chute, said third chute positioned below said second chute and receiving said fin upon said fins exiting said second chute wherein said fins exit said third chute onto said second conveyor in a position such that the fins travel in a direction transverse their longitudinal axis;
an oscillating guide positioned on said second conveyer; and
a sensor mounted to said second conveyor and sensing the presence of fins on said second conveyor, said sensor communicating with said fin mill to vary the output rate of said fin mill.

16. An apparatus for transporting and delivering fins emanating from a fin mill, said apparatus comprising:
a first conveyor transporting said fins emanating from said fin mill in a direction parallel a longitudinal axis of said fins;
a second conveyor having one end spaced laterally from an end of said first conveyor;
a tier of separate chutes disposed between the ends of said first conveyor and said second conveyor for receiving said fins from said fin mill via said first conveyor and depositing said fins on said second conveyor such that the longitudinal axis of said fins is perpendicular to the direction of travel of said second conveyor, said tier of separate chutes including a first chute receiving said fins traveling in a direction parallel their longitudinal axis, a second chute positioned below said first chute and receiving said fins upon said fins exiting said first chute, and a third chute, said third chute positioned below said second chute and receiving said fins upon said fins exiting said second chute wherein said fins exit said third chute onto said second conveyor; and an oscillating guide positioned on said second conveyor, said oscillating guide including a carriage mounted for oscillatory movement on a support member, a guide rail attached to said carriage, a drive link attached on a first end thereof to said carriage and attached on a second end thereof to a powertrain driving said drive link.

17. An apparatus as set forth in claim 16 wherein said first conveyor includes a plurality of guide rails positioned thereon to guide said fins, a gate, pivotally mounted to said first conveyor, said gate movable between a first, open position and a second, closed position wherein when said gate is placed in said first, open position, said fins travel freely on said first conveyor from said fin mill to said tier of chutes and when said gate is positioned in said second, closed position, said fins contact said gate and are shunted from said first conveyor to an overflow storage receptacle, and a sensor mounted on said second conveyor, said sensor detecting the presence of fins, said sensor signaling said overflow gate to move to said second, closed position when said sensor detects the presence of fins.

18. An apparatus for transporting and delivering fins emanating from a fin mill, said apparatus comprising:

a first conveyor transporting said fins emanating from said fin mill in a direction parallel a longitudinal axis of said fins;

a tier of chutes receiving said fins from said fin mill via said first conveyor and depositing said fins on a second conveyor such that the longitudinal axis of said fins is perpendicular to the direction of travel of said second conveyor, said tier of chutes including a first chute receiving said fins traveling in a direction parallel their longitudinal axis, a second chute positioned below said first chute and receiving said fins upon said fins exiting said first chute, and a third chute, said third chute positioned below said second chute and receiving said fins upon said fins exiting said second chute wherein said fins exit said third chute onto said second conveyor;

an oscillating guide positioned on said second conveyor, said oscillating guide including a carriage mounted for oscillatory movement on a support member, a guide rail attached to said carriage, a drive link attached on a first end thereof to said carriage and attached on a second end thereof to a powertrain driving said drive link; and wherein said powertrain includes a pulley supported on a shaft for rotational movement, a drive motor connected to and driving said shaft, a spindle attached to said pulley and connected to said drive link, said spindle having a centerline and said pulley having a centerline, said spindle attached to said pulley such that the centerline of said spindle is offset from the centerline of said pulley.

19. An apparatus for transporting and delivering fins emanating from a fin mill, said apparatus comprising:

a first conveyor transporting said fins emanating from said fin mill in a direction parallel a longitudinal axis of said fins;

a tier of chutes receiving said fins from said fin mill via said first conveyor and depositing said fins on a second conveyor such that the longitudinal axis of said fins is perpendicular to the direction of travel of said second conveyor, said tier of chutes including a first chute receiving said fins traveling in a direction parallel their longitudinal axis, a second chute positioned below said first chute and receiving said fins upon said fins exiting said first chute, and a third chute, said third chute positioned below said second chute and receiving said fins upon said fins exiting said second chute wherein said fins exit said third chute onto said second conveyor;

an oscillating guide positioned on said second conveyor, said oscillating guide including a carriage mounted for oscillatory movement on a support member, a guide rail attached to said carriage, a drive link attached on a first end thereof to said carriage and attached on a second end thereof to a powertrain driving said drive link; and a sensor mounted to said second conveyer and sensing the presence of fins on said second conveyer, said sensor communicating with said fin mill to vary the output rate of said fin mill.

\* \* \* \* \*